(12) United States Patent
Dorsey et al.

(10) Patent No.: US 10,101,791 B2
(45) Date of Patent: Oct. 16, 2018

(54) PROCESSOR THROTTLE RATE LIMITER

(71) Applicant: Apple Inc., Cupertino, CA (US)

(72) Inventors: John G. Dorsey, San Francisco, CA (US); Keith Cox, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 14/869,854

(22) Filed: Sep. 29, 2015

(65) Prior Publication Data

US 2016/0357243 A1    Dec. 8, 2016

Related U.S. Application Data

(60) Provisional application No. 62/171,491, filed on Jun. 5, 2015.

(51) Int. Cl.
*G06F 1/32* (2006.01)

(52) U.S. Cl.
CPC ............ *G06F 1/3228* (2013.01); *G06F 1/324* (2013.01); *G06F 1/3206* (2013.01); *G06F 1/329* (2013.01); *G06F 1/3296* (2013.01); *Y02D 10/126* (2018.01); *Y02D 10/172* (2018.01); *Y02D 10/24* (2018.01)

(58) Field of Classification Search
CPC ...... G06F 1/3206; G06F 1/3228; G06F 1/324; G06F 1/329; G06F 1/3296; Y02D 10/126; Y02D 10/172; Y02D 10/24

See application file for complete search history.

(56) References Cited

U.S. PATENT DOCUMENTS

| | | | | |
|---|---|---|---|---|
| 6,065,140 | A * | 5/2000 | Irwin | H03L 1/022 331/16 |
| 7,840,827 | B2 * | 11/2010 | Dahan | G09G 5/363 345/545 |
| 9,128,721 | B2 | 9/2015 | Dorsey et al. | |
| 2002/0194509 | A1 * | 12/2002 | Plante | G06F 1/206 713/300 |
| 2007/0260894 | A1 * | 11/2007 | Aguilar, Jr. | G06F 1/206 713/300 |
| 2013/0328890 | A1 * | 12/2013 | Avkarogullari | G06F 1/206 345/501 |

(Continued)

*Primary Examiner* — Fahmida Rahman
(74) *Attorney, Agent, or Firm* — Kilpatrick Townsend & Stockton (57) ABSTRACT

The embodiments set forth a technique for providing reactive performance throttle engagement information to controller limiters, which are implemented as closed loop structures that analyze the information against target reactive performance throttle engagement rates and produce control effort limits. When reactive performance throttle engagement rates are below the target, controllers issue control efforts in a normal fashion such that they are not influenced by the control effort limits produced by the controller limiters. However, the controller limiters are also configured such that when reactive performance throttle engagement rates are above the target, the controllers issue control efforts in a modified fashion—specifically, in accordance with the control effort limits produced by the controller limiters. In this manner, control effort limits can effectively clamp the control efforts when particular conditions—such as excessive reactive performance throttle engagement rates—are being met.

15 Claims, 6 Drawing Sheets

(56) References Cited

U.S. PATENT DOCUMENTS

2014/0006819 A1* 1/2014 Min .................. G06F 1/324
 713/320
2015/0192980 A1* 7/2015 Sen .................. G06F 1/3203
 713/320

\* cited by examiner

PROCESSOR THROTTLE RATE LIMITER

CROSS-REFERENCE TO RELATED APPLICATIONS

The present application claims the benefit of U.S. Provisional Application No. 62/171,491, entitled "PROCESSOR THROTTLE RATE LIMITER", filed Jun. 5, 2015, the content of which is incorporated herein by reference in its entirety for all purposes.

TECHNICAL FIELD

The present embodiments relate generally to power management within a mobile computing device. More particularly, the present embodiments relate to controlling the manner in which reactive performance throttles are imposed on processors (e.g., a central processing unit (CPU), a graphics processing unit (GPU), etc.) included in the mobile computing device.

BACKGROUND

The peak demands placed on electrical power delivery systems within mobile computing devices typically scale with their performance capabilities, which have substantially increased over time. Notably, when an active power operating level reaches a "peak" level—that is, a ratio between the active power operating level and the average (i.e., typical) power operating level is substantial and satisfies a threshold—it may be inefficient, with respect to cost, size, and/or complexity, to provision the electrical power delivery system for worst-case loads that do not commonly occur. Conversely, it is unacceptable for the operability of a mobile computing device to fail (e.g., crashing as a result of a brownout) during the execution of a high-power, but otherwise valid workload.

Hardware designers have introduced mechanisms to maintain safe operating conditions for under-provisioned electrical power delivery systems. An important class of these mechanisms, for example, involves reactive performance throttles that are configured to modulate the performance of a load to conform its power envelope to the capacity of the electrical power delivery system. Such mechanisms can be configured to, for example, monitor power levels using analog circuits (e.g., current sensors, voltage droop detectors, etc.), and/or monitor power using digital methods (e.g., counter-based energy estimators). When power levels exceed a target rate, these mechanisms can be configured to reduce the performance of the load in order to restore the power levels to fall below the target rate. Such reductions can be achieved, for example, by reducing a clock frequency (and/or reducing a supply voltage) of a processor, by slowing the issue rate of instructions to the processor, or by other means.

Although the foregoing mechanisms can provide a safety guarantee with respect to processor operability, they also can unnecessarily cause considerable performance drawbacks. For example, in some cases, reactive performance throttles can introduce anomalies (e.g., user interface lag) that are visible to a user and scale with the magnitude of the reactive performance throttle. An example of a large-magnitude throttling action is "clock division," which involves reducing a clock frequency of a processor—such as a CPU or a GPU—by factors of two, four, or more. Notably, if this action is frequently taken—e.g., when the high-power condition is persistent rather than transient—the effective performance of the mobile computing device may fall short of its performance potential, which can degrade overall user satisfaction.

SUMMARY

The embodiments set forth herein are directed to control techniques that can be used to mitigate performance defects that are caused by reactive performance throttles. The purpose of such controls is not to ensure safety or power supply integrity, as hardware components are already intrinsically safe because of the reactive performance throttles. Rather, the control techniques serve to increase effective mobile computing device performance by marginally reducing power and preventing frequent, large-magnitude throttling actions from engaging.

One embodiment sets forth a method for scaling a performance mode of a component included in a mobile computing device. The method includes the steps of (1) establishing one or more controllers, wherein each controller of the one or more controllers is configured to output a control effort whose value corresponds to a desired performance level for the component, (2) establishing at least one controller limiter, wherein the at least one controller limiter is configured to output a control effort limit whose value corresponds to a manner in which reactive performance throttles are engaging against the component, (3) identifying, among the control efforts output by the one or more controllers, a particular control effort whose value indicates a highest performance level for the component, and (4) causing a performance level of the component to scale in accordance with the particular control effort and the control effort limit.

Another embodiments set forth a non-transitory computer readable storage medium configured to store instructions that, when executed by a processor included in a mobile computing device, cause the mobile computing device to scale a performance mode of a component included in the mobile computing device, by carrying out steps that include (1) establishing one or more controllers, wherein each controller of the one or more controllers is configured to output a control effort whose value corresponds to a desired performance level for the component, (2) identifying, among the control efforts output by the one or more controllers, a particular control effort whose value indicates a highest performance level for the component, (3) establishing a controller limiter configured to output a control effort limit whose value corresponds to a manner in which reactive performance throttles are engaging against the component, and (4) causing a performance level of the component to scale in accordance with either the particular control effort or the control effort limit.

Yet another embodiment sets forth a mobile computing device configured to scale a performance mode of a component included in the mobile computing device. Specifically, the mobile computing device includes the component, and a processor configured to cause the mobile computing device to carry out steps that include (1) establishing at least one controller, wherein the at least one controller is configured to produce a control effort whose value corresponds to a desired performance level for the component, (2) establishing at least one controller limiter, wherein the at least one controller limiter is configured to output a control effort limit that influences the control effort produced by the at least one controller, and (3) causing a performance level of the component to scale in accordance with the influenced control effort.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

In the figures, elements referred to with the same or similar reference numerals include the same or similar structure, use, or procedure, as described in the first instance of occurrence of the reference numeral.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Mobile computing devices can include processors such as CPUs and GPUs that support multiple performance states (e.g., a frequency/voltage pair). For example, at low frequencies and voltages, a processor executes work efficiently, but slowly. Performing work in this low state is advantageous for battery life and mobile computing device temperature. At high frequencies and voltages, the processor executes work quickly, but consumes more energy. Notably, performing work in this state may be unsustainable for physical reasons such as thermal and electrical power delivery constraints associated with the mobile computing device.

A mobile computing device can be configured to implement a performance control system to dynamically adjust the performance states of the different components (e.g., processors, memories, etc.) included within the mobile computing device. More specifically, this performance control system is configured to allocate increased component performance capabilities to workloads that can productively use them. The performance control system can be configured to consider various information gathered from within the mobile computing device in order to make its performance allocation decisions. The information used by the performance control system can include, for example, processor utilization rates, program instruction mixtures, memory throughputs, Input/Output (I/O) transaction rates, display frame rates, and the like. More specifically, this information can be provided to different "closed loop" structures (referred to herein as "controllers") that produce "control efforts" (i.e., requests for performance states). According to some embodiments, a control effort can be continuous or discrete, where its value increases monotonically with performance, e.g., low control efforts map to low performance, and high control efforts map to high performance. A detailed explanation of a performance control system configured to implement various controllers is set forth in application Ser. No. 13/913,307, filed on Jun. 7, 2013, and titled "CLOSED LOOP CPU PERFORMANCE CONTROL", the entire contents and disclosures of which are hereby incorporated by reference.

In some cases, a mobile computing device can be configured to implement reactive performance throttles that override the performance allocation decisions made by the performance control system. More specifically, a reactive performance throttle can reduce the performance of a component in order to maintain load power below a target rate. According to this approach, when load power infrequently exceeds the target rate, the reactive performance throttle will correspondingly and infrequently engage, and the overall effect on component performance will be insignificant. On the other hand, when load power frequently exceeds the target rate, the reactive performance throttle will correspondingly and frequently engage, and the effective component performance will change more noticeably. Although these reactive performance throttles can provide a safety guarantee with respect to component operability, they also can unnecessarily cause considerable performance drawbacks (e.g., user interface lag) that are visible to a user and scale with the magnitude of the reactive performance throttle.

Accordingly, the embodiments described herein set forth control techniques that can be used to mitigate the foregoing performance defects that can be caused by reactive performance throttles. More specifically, these control techniques serve to increase the effective performance of a mobile computing device by marginally reducing power and preventing frequent, large-magnitude throttling actions that otherwise establish bottlenecks within the mobile computing device.

As previously set forth herein, the embodiments are directed to mobile computing devices in which reactive performance throttles are implemented and cause performance levels to be reduced by a substantial factor. It may be beneficial, for example, to override a reactive performance throttle when the amount by which the reactive performance throttle reduces performance heavily exceeds an amount performance that is otherwise suggested by the performance control system. For example, a reactive performance throttle that employs clock division at a processor could aim to reduce performance anywhere from 50% to 90%, whereas a performance change suggested by the performance control system might reduce performance by only 5% or 10%. Notably, in many cases it can be preferable to step down the performance of the processor by a small number (e.g., 5% or 10%) in order to keep power below the target rate, which can correspondingly cause reactive performance throttles from frequently engaging and incurring drastic performance penalties.

Accordingly, to achieve the foregoing and alternative approach, the embodiments set forth herein involve configuring the performance control system to monitor reactive performance throttles associated with components (e.g., CPUs, GPUs, memories, etc.) within the mobile computing device. When appropriate, the performance control system can be configured to modulate the performance levels that would otherwise be requested when reactive performance throttles are not being engaged. In this manner, the rate at which the reactive performance throttles engage can be reduced or eliminated entirely, thereby enabling components within the mobile computing device to operate at a level of efficiency that is commensurate with the number and complexity of tasks that need to be carried out.

According to some embodiments, the performance control system is implemented as a component of an operating system executing on the mobile computing device, and is capable of identifying when reactive performance throttles are engaged within the mobile computing device. For example, when a reactive performance throttle associated with a component included in the mobile computing device is engaged, the component can be configured to issue an interrupt that is passed through layers of the operating system to the performance control system. Notably, various architectures can implement different approaches with respect to how the reactive performance throttle affects the performance of a component within the mobile computing device. For example, a reactive performance throttle can be hardware-based and configured to directly reduce the performance of a component (e.g., via clock division, via an automatic performance state change, etc.). In some cases, such hardware-based reactive performance throttles can require a software-based component to restore the performance of the component back to a normal mode. According to this approach, an interrupt can be interpreted by the performance control system as an indication that the performance of the component should be restored back to the normal mode (when appropriate). In some cases, the performance control system can be configured to identify information associated with the interrupts in order to infer additional, useful information. For example, the performance control system can be configured to count a number of interrupts that are observed over a sample interval of time and calculate a rate at which reactive performance throttles are being engaged.

Additionally, it is noted that non-interrupt-based approaches can be implemented by the performance control system to identify rates at which different reactive performance throttles are being engaged within the mobile computing device. For example, reactive performance throttle engagements can be recorded by a hardware counter (e.g., a performance counter) that the performance control system is configured to periodically sample, thereby enabling the performance control system to identify the manner in which reactive performance throttles are engaging within the mobile computing device. In another example, the performance control system can infer the rate at which reactive performance throttles are engaging by comparing measured (i.e., active) component performance levels against expected component performance levels, e.g., by counting clock cycles and identifying substantial discrepancies between what is being observed and what is expected.

According to some embodiments, and as described in greater detail herein, reactive performance throttle engagement information can be provided to "controller limiters," which, according to some embodiments, are implemented as closed loop structures that analyze the information against target reactive performance throttle engagement rates and produce "control effort limits." More specifically, the controller limiters are configured such that when reactive performance throttle engagement rates are below the target, the controllers implemented by the performance control system issue their control efforts in a normal fashion such that they are not influenced by the control effort limits produced by the controller limiters. However, the controller limiters are also configured such that when reactive performance throttle engagement rates are above the target, the controllers implemented by the performance control system issue their control efforts in a modified fashion—specifically, in accordance with the control effort limits produced by the controller limiters. For example, when the reactive performance throttle engagement rates are above the target, a controller can output a control effort that requests a lower performance state than usual in an attempt to reduce the rate at which reactive performance throttles are being engaged. In this manner, control effort limits can effectively clamp the control efforts when particular conditions—such as excessive reactive performance throttle engagement rates—are being met.

A controller limiter can calculate a control effort limit using a variety of approaches, e.g., using a closed loop structure, where reactive performance throttle engagement information (referred to herein as a "process variable") is fed into the controller limiter. As described above, the controller limiter can also be configured to incorporate a target reactive performance throttle engagement rate that is tunable to reflect when an influential control effort limit should be produced. According to some embodiments, a difference between the process variable and the target reactive performance throttle engagement rate is an error term that is supplied to an integrator implemented within the controller limiter. More specifically, the integrator can be configured to accumulate a new error term periodically (e.g., every ten milliseconds) and retain a history of reactive performance throttle engagement rate behavior, where the accumulated error terms establish and define the control effort limit. Moreover, the controller limiter may have other tunable parameters, including gains. For example, the controller limiter can be configured to multiply each error term by a gain prior to integration. In another example, the controller limiter can be configured to support distinct gains for positive and negative error terms, thereby enabling designers to separately-tune the transient responses of the controller limiter.

Accordingly, when the reactive performance throttle engagement rate is generally below the target, the integrator of the controller limiter will unwind toward a high control effort limit, and corresponding controllers are free to request a full range of performance modes via uninfluenced control efforts. Conversely, when the reactive performance throttle engagement rate generally exceeds the target, the integrator of the controller limiter will accumulate errors and suppress the control effort limit, thereby causing a reduction in the performance modes requested by the corresponding controllers. In turn, these reductions can correspondingly establish a decrease in the rate at which reactive performance throttles engage within the mobile computing device, and can contribute to alleviating potential performance issues.

Notably, although only a single controller limiter is described above, it is noted that the embodiments set forth herein contemplate any number of controller limiters that can be configured to monitor aspects of the mobile computing device that extend beyond reactive performance throttles. For example, other controller limiters can be implemented and configured to monitor power targets within the mobile computing device, temperature targets within the mobile computing device, and the like. When multiple control effort limits exist, the performance control system can be configured such that the minimum control effort limit clamps the control efforts produced by the controllers implemented within the performance control system.

When a mobile computing device includes multiple processors, some or all of the processors may have corresponding controller limiters. For example, in some cases, the performance control system can be configured such that only a subset of the processors included in the mobile computing device have corresponding controller limiters. This can be beneficial, for example, in a mobile computing device that includes a CPU and a GPU, where the CPU generally produces work for consumption by the GPU. More specifically, and according to this example, reducing the performance state of the CPU likely will correspondingly impede the performance state of the GPU, thereby reducing power consumption for both entities. In another example, the performance control system can be configured such that each processor included in the mobile computing device has a corresponding controller limiter. These controller limiters may be independent from one another, or may be coordinated by decision logic that prioritizes controller limiter actions.

Figure 1:
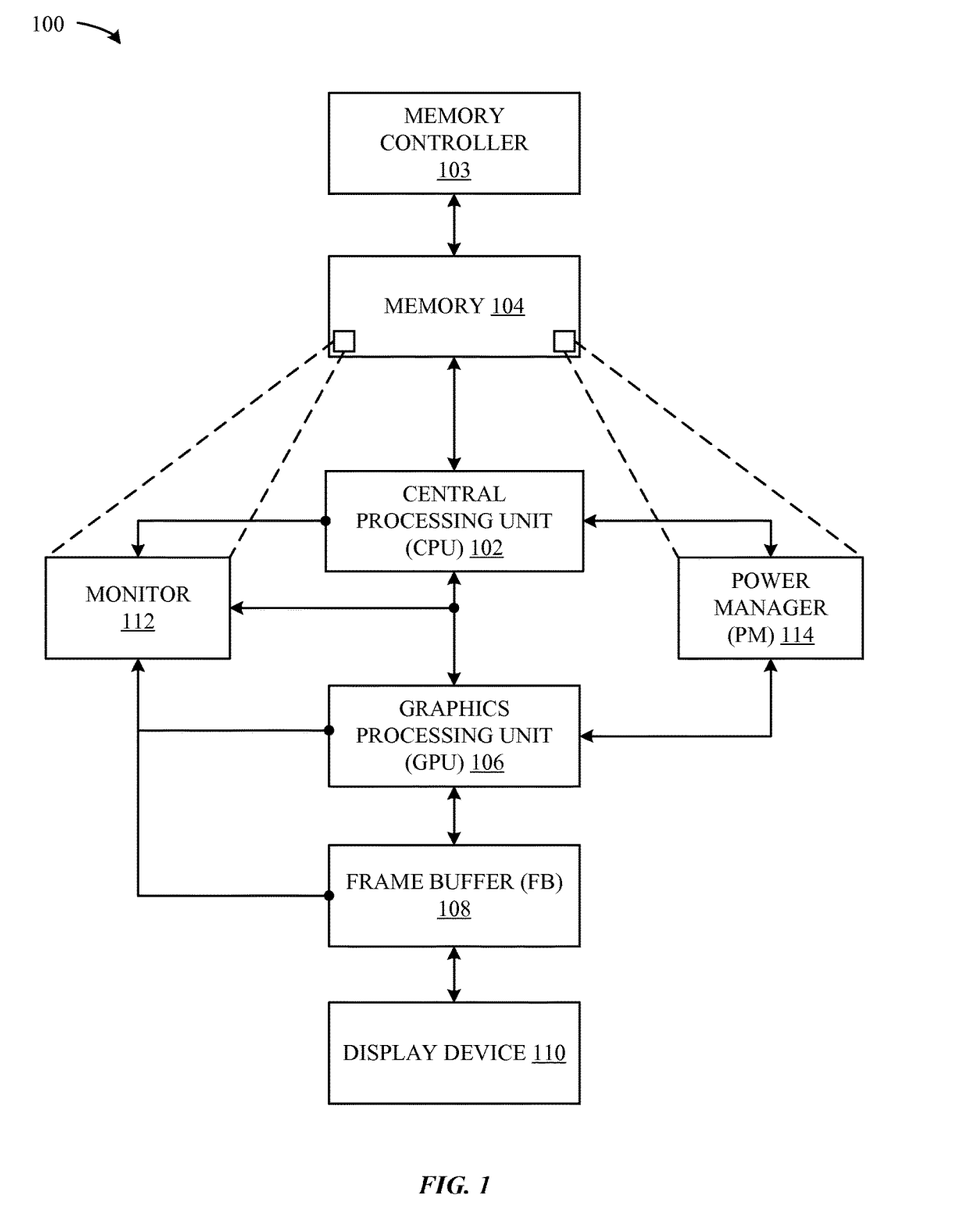
FIG. 1 illustrates a block diagram of a mobile computing device configured to implement the various techniques set forth herein, according to one embodiment.

FIG. 1 illustrates a block diagram of a mobile computing device 100 configured to implement the various techniques set forth herein, according to one embodiment. As shown in FIG. 1, a mobile computing device 100 includes subsystems such as a CPU 102, a memory controller 103, a system memory 104, a GPU 106, a frame buffer 108, and a display device 110. As is well-known, the CPU 102 generates and transmits instructions to the GPU 106 for execution, where the GPU 106 consumes the instructions at a rate that is influenced at least by the utilization rate of the GPU 106 and a rate at which the CPU 102 is generating and transmitting the instructions to the GPU 106. The frame buffer 108 is configured to continually receive and store an updated sequence of frames that are eventually output to the display device 110. Also shown in FIG. 1 are a monitor 112 and a power manager 114, which are loaded in the system memory 104 and configured to execute on the mobile computing device 100. In one embodiment, the system memory 104 includes both a DRAM subsystem (not illustrated) and a flash memory subsystem (not illustrated) that are managed by the memory controller 103. Although not illustrated in FIG. 1, each of the monitor 112 and the power manager 114 can run on an operating system (OS) that is configured to execute on the mobile computing device 100. Additionally, the monitor 112 and the power manager 114 can run on a management co-processor (not illustrated) that is separate and distinct from the CPU 102.

According to some embodiments, and as described in greater detail below, the monitor 112 can be configured to implement various techniques directed toward identifying circumstances where a change in the voltage and/or frequency of a component within the mobile computing device 100 is beneficial. In particular, the monitor 112 receives, from a number of controllers, control efforts that scale with a focus on a particular activity within mobile computing device 100, e.g., the rate of change in the NFPS being input to the frame buffer 108, the utilization rate of GPU 106, the data throughputs of the memory controller 103, the rate at which specific types of instructions are being executed by CPU 102, the rate at which a user interface is being updated, and the like. Moreover, and as previously set forth herein, the monitor 112 can also receive, from a number of controller limiters, control effort limits that are output in accordance with reactive performance throttles, if any, that are being engaged against components included in the mobile computing device 100. In turn, the monitor 112 processes the various control efforts and control effort limits and outputs a signal to the power manager 114, whereupon the power manager 114 correspondingly scales the voltage and/or frequency of a component included in the mobile computing device 100 (e.g., the CPU 102, the GPU 106, the system memory 104, etc.).

Given a selected performance increase, the mapping to the component performance configuration may vary. In one embodiment, a range of values for the control signal(s) may be linearly mapped to qualified frequencies of the component (e.g., the CPU 102). In a related embodiment, the mapping may instead be linear in voltage rather than frequency. In another embodiment, the mapping may involve the use of frequency/voltage dithering to produce a more precise mapping through pulse-width modulation techniques. In yet another embodiment, the mapping may also determine the number of component cores that may be concurrently active in a multi-core environment. For example, a lower control signal may restrict the component to single-core operation as a means of conserving energy. In yet another embodiment, the mapping may also determine the selection of a primary core or secondary core, where the primary core is more powerful than the secondary core and is configured to operate during high demand periods, and where the secondary core is less powerful than the primary core and is configured to operate during low demand periods.

Figure 2A:
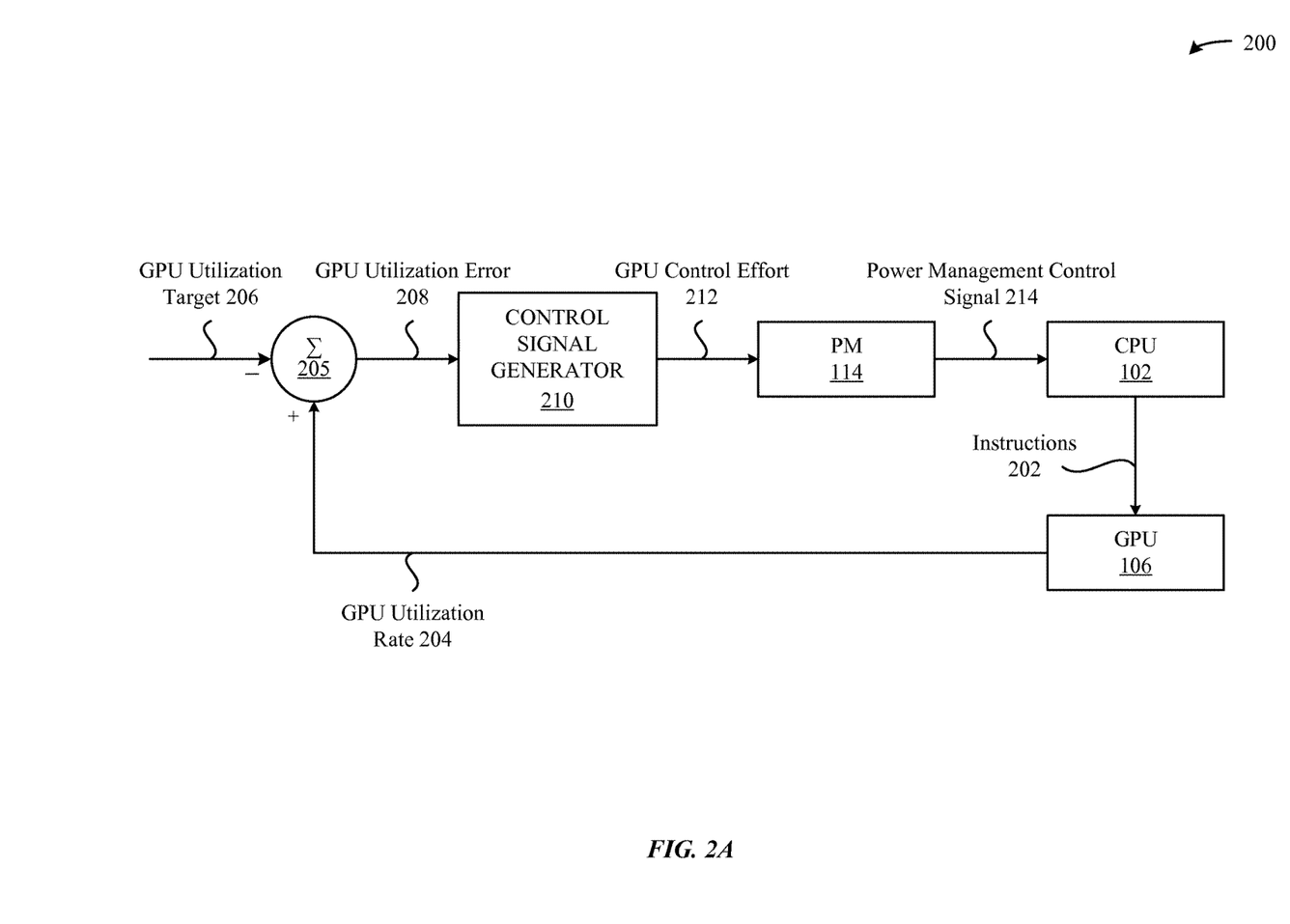
FIG. 2A illustrates a conceptual diagram of an example controller that is configured to scale the power and/or frequency of a CPU based on a utilization rate of a GPU, according to some embodiments.

FIG. 2A illustrates a conceptual diagram 200 of an example controller that is configured to scale the power and/or frequency of the CPU 102 based on a utilization rate of GPU 106, according to some embodiments. As shown in FIG. 2A, the conceptual diagram 200 includes a closed loop structure that is directed to analyzing the utilization rate of GPU 106. In particular, the GPU 106 provides GPU utilization rate feedback 204 to a comparator 205, which is configured to compare the GPU utilization rate feedback 204 to a GPU utilization target 206 (e.g., 99%).

As shown in FIG. 2A, the comparator 205 outputs a GPU utilization error 208 to a control signal generator 210, where the GPU utilization error 208 is based on the GPU utilization rate feedback 204 and the GPU utilization target 206. The control signal generator 210 can be any form of a controller filter that is closed loop stable. In one embodiment, the control signal generator 210 can be an integrator that, in turn, integrates GPU utilization errors 208 as they are output by the comparator 205 and outputs a GPU control effort 212 to the power manager 114. According to some embodiments, the control signal generator 210 can be configured to apply a gain the integrated GPU utilization errors 208. In turn, the power manager 114 receives the GPU control effort 212 and outputs a power management control signal 214 that scales the power and/or frequency of the CPU 102. In this manner, the performance of the CPU 102 scales with the utilization rate of the GPU 106 so that the CPU 102 is able to issue instructions at a rate that is commensurate with the rate at which GPU 106 is consuming the instructions. As a result, bottlenecks that often occur between the CPU 102 and the GPU 106 are reduced or eliminated, thereby enhancing overall performance of mobile computing device 100 and ensuring that the full potential of the GPU 106 is not hindered by lack of CPU 102 performance.

Figure 2B:
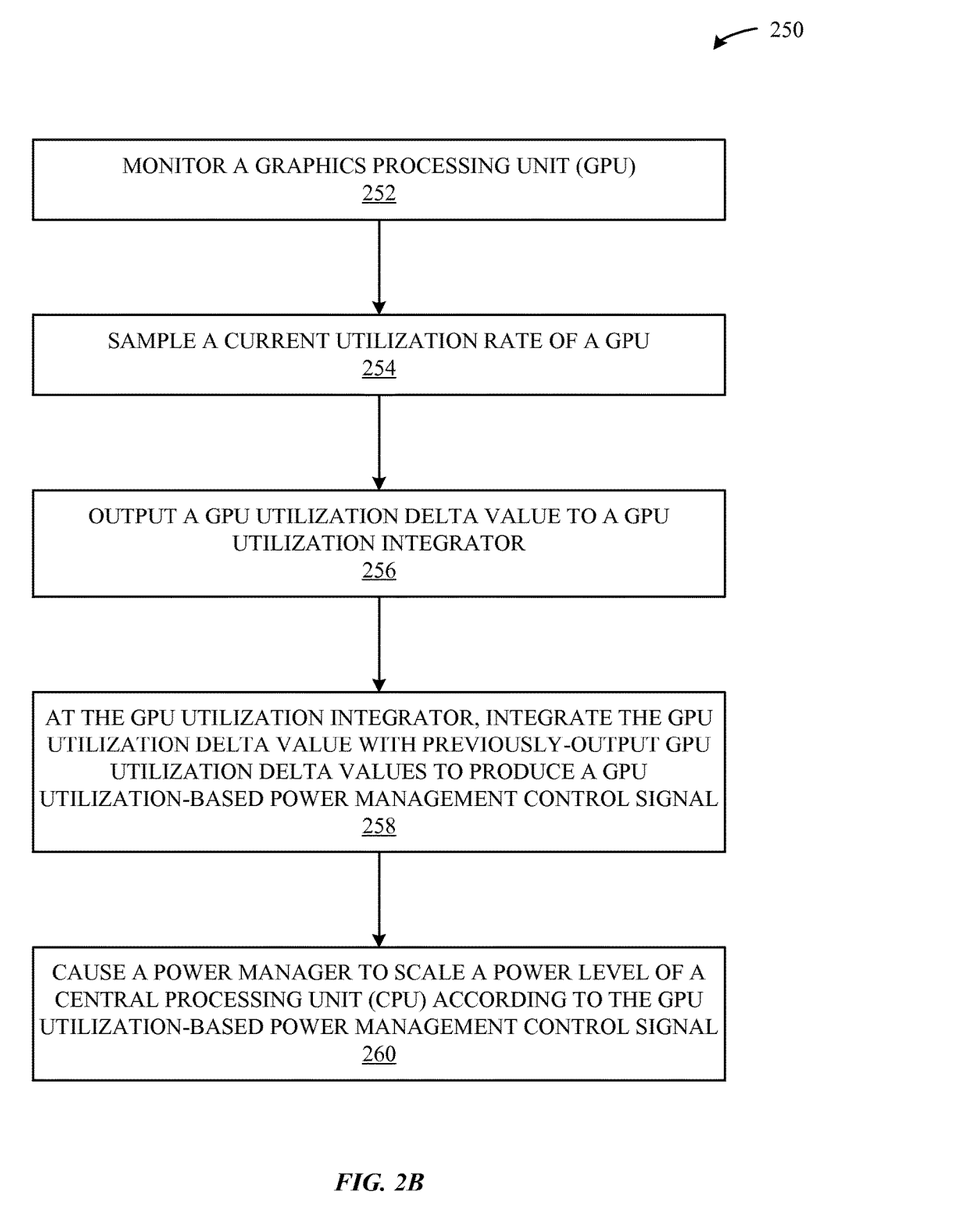
FIG. 2B illustrates a method for scaling the power and/or frequency of a CPU based on the utilization rate of a GPU, according to some embodiments.

FIG. 2B illustrates a method 250 for scaling the power and/or frequency of the CPU 102 based on the utilization rate of GPU 106, according to some embodiments. Although the method 250 is described in conjunction with FIGS. 1 and 2A, persons skilled in the art will understand that any system configured to perform the method steps, in any order, is within the scope of the described embodiments. As shown in FIG. 2B, the method 250 begins at step 252, where the monitor 112 configures itself to monitor the GPU 106. At step 254, the monitor 112 samples a current utilization rate of the GPU 106. At step 256, the monitor 112 outputs a GPU utilization error value to a GPU utilization integrator. Notably, steps 252-256 represent the comparator 205 and the control signal generator 210 described above in conjunction with FIG. 2A. At step 258, the monitor 112 integrates, at the GPU utilization integrator, the GPU utilization error value with previously-output GPU utilization error values to produce a GPU utilization-based control effort. At step 260, the monitor 112 causes the power manager 114 to scale the power and/or frequency of the CPU 102 according to the GPU utilization-based control effort.

Figure 3A:
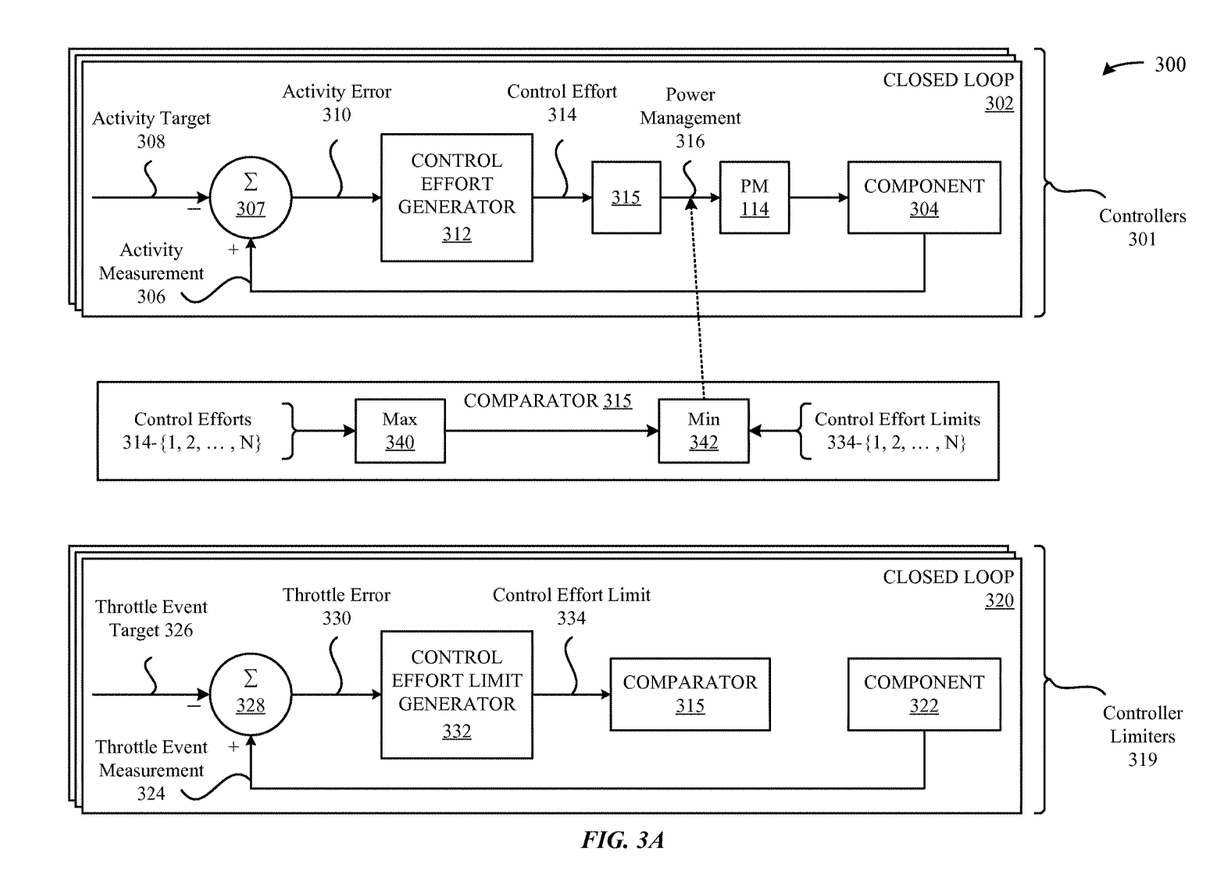
FIG. 3A illustrates a conceptual diagram of various controllers and controller limiters that are configured to implement the different techniques described herein.

FIG. 3A illustrates a conceptual diagram 300 of various controllers 301 and controller limiters 319 that are configured to implement the different techniques described herein. Specifically, and as shown in FIG. 3A, the controllers 301—which are designed to adjust the performance states of the different components (e.g., processors, memories, etc.) included within the mobile computing device 100—can be implemented as closed loop structures 302 (also referred to herein as "performance control pipelines").

As shown in FIG. 3A, a closed loop structure 302 can be configured to monitor a specific component (e.g., the CPU 102) included in the mobile computing device 100, which is represented by the component 304 illustrated in FIG. 3A. More specifically, the closed loop structure 302 can be configured to monitor a specific operating aspect of the component 304. For example, when the component 304 represents the CPU 102, the specific operating aspect can be a utilization rate associated with the CPU 102, which is represented by the activity measurement 306 illustrated in FIG. 3A. As further shown in FIG. 3A, the activity measurement 306 is compared, at a comparator 307, against an activity target 308, and the comparator 307 outputs an activity error 310 to a control effort generator 312. According to some embodiments, the control effort generator 312 can represent any form of a controller filter that is closed loop stable. For example, in one embodiment, the control effort generator 312 can represent an integrator that, in turn, integrates activity errors 310 as they are output by the comparator 307, and outputs a control effort 314. In some embodiments, the control effort generator 312 can also be configured to apply a gain to the integrated activity errors 310 in order to amplify the control effort 314. As shown in FIG. 3A, the control effort 314 is provided to a comparator 315 that is implemented by the monitor 112 and described below in greater detail. As shown in FIG. 3A, the comparator 315 outputs a power management signal 316 to the power manager 114. In turn, the power manager 114 can scale the voltage and/or frequency of the component 304 in accordance with the power management signal 316. Accordingly, a closed loop structure 302 can cause the power manager 114 to dynamically scale the performance of different components included in the mobile computing device 100 in accordance with the workloads at hand.

Although, in FIG. 3A, the closed loop structures 302 are illustrated and named in a generic sense, it is noted that these closed loop structures can be specifically tailored to monitor different operation aspects of components included in the mobile computing device 100. For example, the monitor 112 can be configured to implement a closed loop structure 302 to monitor a utilization rate of the CPU 102, another closed loop structure 302 to monitor program instruction mixtures being issued to the CPU 102, yet another closed loop structure 302 to monitor throughput rates to the system memory 104, and so on.

As mentioned above, FIG. 3A also illustrates various controller limiters 319, which can be implemented as closed loop structures 320. As described in greater detail below, the control effort limits that are output by the controller limiters 319 are designed to clamp the control efforts 314 (output by the controllers 301) when particular conditions—such as excessive reactive performance throttle engagement rates—are being met. As shown in FIG. 3A, a closed loop structure 320 can be configured to monitor reactive performance throttles associated with a specific component (e.g., the CPU 102) included in the mobile computing device 100, which is represented by the component 322 illustrated in FIG. 3A. Similar to a closed loop structure 302, a closed loop structure 320 is configured to monitor a particular aspect of the component 322—specifically, reactive performance throttles that are engaged against the component 322—which is represented by the throttle event measurement 324 illustrated in FIG. 3A. The throttle event measurement 324 is compared, at a comparator 328, against a throttle event target 326, and the comparator 328 outputs a throttle error 330 to a control effort limit generator 332. According to some embodiments, the control effort limit generator 332 can represent any form of a controller filter that is closed loop stable. For example, in one embodiment, the control effort limit generator 332 can represent an integrator that, in turn, integrates throttle errors 330 as they are output by the comparator 328. In turn, the control effort limit generator 332 outputs control efforts 334 to the comparator 315, the functionality of which is described below in greater detail. In some embodiments, the control effort limit generator 332 can also be configured to apply a gain to the integrated throttle errors 330 in order to amplify the control effort limit 334.

As shown in FIG. 3A, the comparator 315 can be configured to receive, for each closed loop structure 302 that is implemented by the monitor 112, an associated control effort 314 that is output by the control effort generator 312 that corresponds to the closed loop structure 302. More specifically, each of the control efforts 314 are input into a maximizer 340 that is configured to output the control effort 314 having the largest value (assuming the monitor 112 is configured to interpret the largest value as the highest demand for performance). In turn, the maximizer outputs the appropriate control effort 314 to a minimizer 342, which is described below in greater detail. As also shown in FIG. 3A, the comparator 315 can be configured to receive, for each closed loop structure 320 that is implemented by the monitor 112, an associated control effort limit 334 that is output by the control effort limit generator 332 that corresponds to the closed loop structure 320. More specifically, each of the control effort limits 334 input in the minimizer 342 that, in turn, outputs to the power manager 114 a power management signal 316 equal to a control effort 314 or a control effort limit 334 having a smallest value (assuming the monitor 112 is configured to interpret the smallest value as the lowest demand for performance). In turn, the power manager 114 can scale the voltage and/or frequency of the component 304 in accordance with the power management signal 316.

Accordingly, the comparator 315 is configured such that when reactive performance throttle engagement rates are below the throttle event target 326, the various controllers 301 implemented by the monitor 112 issue their control efforts 314 in a normal fashion (i.e., they are not influenced by the control effort limits 334 produced by the controller limiters 319). However, the controller limiters 319 are also configured such that when reactive performance throttle engagement rates are above the throttle event target 326, the controllers 301 implemented by the monitor 112 issue their control efforts 314 in a modified fashion—specifically, in accordance with the control effort limits 334 produced by the controller limiters 319. For example, when the reactive performance throttle engagement rates are above the throttle event target 326, a controller 301 can output a control effort 314 that requests a lower performance state than usual, which can cause a reduction in the rate at which reactive performance throttles are being engaged. In this manner, control effort limits 334 can effectively clamp the control efforts 314 when particular conditions—such as excessive reactive performance throttle engagement rates—are being met.

Accordingly, when the reactive performance throttle engagement rate (i.e., throttle event measurement 324) is generally below the throttle event target 326, the control effort limit generator 332 will unwind toward a high control effort limit 334, and corresponding controllers 301 are free to request a full range of performance modes via uninfluenced control efforts 314. Conversely, when the reactive performance throttle engagement rate (i.e., throttle event measurement 324) generally exceeds the throttle event target 326, the control effort limit generator 332 will accumulate throttle errors 330 and suppress the control effort limit 334, thereby causing a reduction in the performance modes requested by the corresponding controllers 301. In turn, these reductions can correspondingly establish a decrease in the rate at which reactive performance throttles engage within the mobile computing device 100, and can contribute to alleviating potential performance issues.

Notably, although only a single controller limiter 319 directed toward reactive performance throttles is described above, it is noted that the embodiments set forth herein contemplate any number of controller limiters 319 that can be configured to monitor aspects of the mobile computing device 100. For example, other controller limiters 319 can be implemented and configured to monitor power targets within the mobile computing device 100, temperature targets within the mobile computing device 100, and the like. When multiple control effort limits 334 exist, the monitor 112 can be configured such that the minimum control effort limit 334 clamps the control efforts 314 produced by the controllers 301.

Figure 3B:
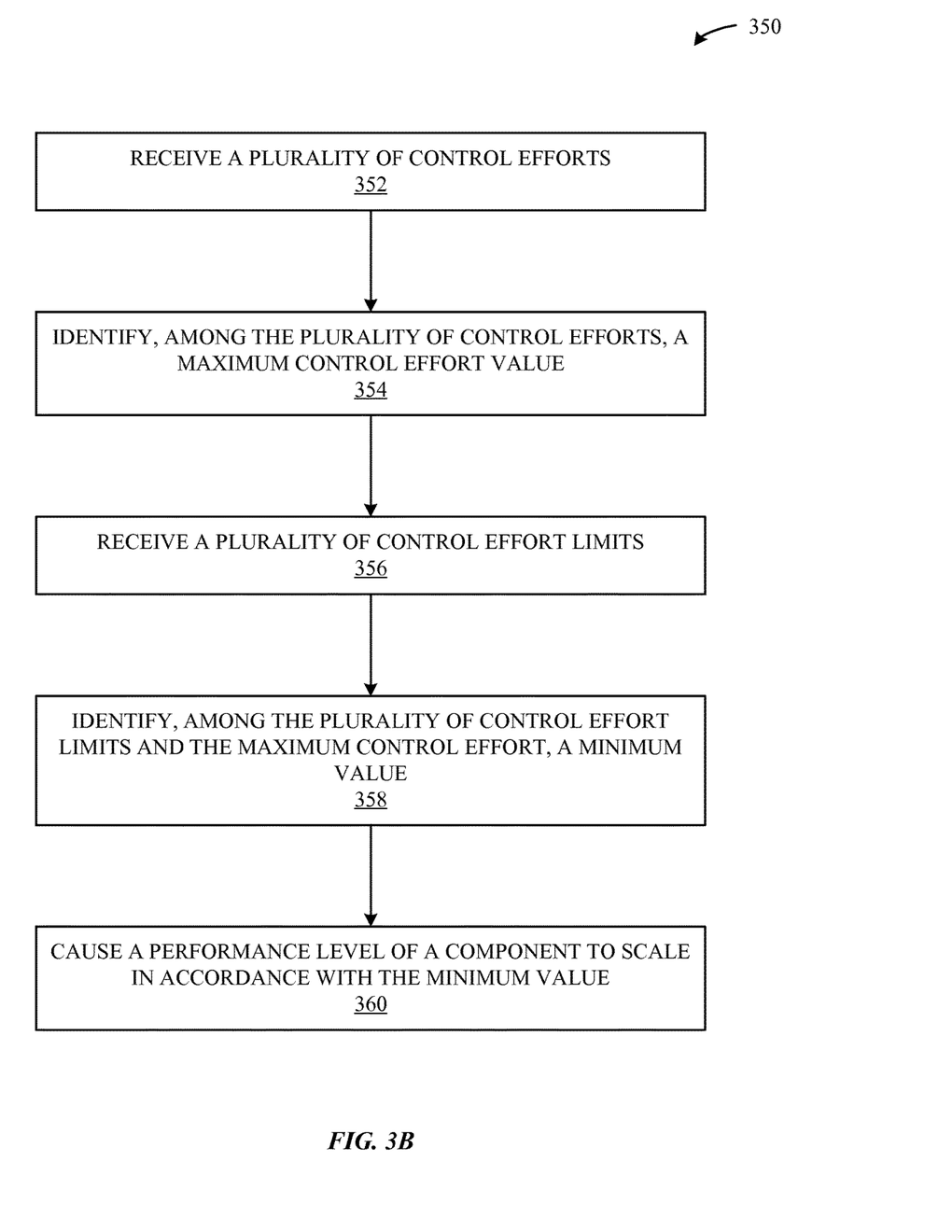
FIG. 3B illustrates a method that represents the operation of a comparator described and illustrated in FIG. 3A, according to some embodiments.

FIG. 3B illustrates a method 350 that represents the operation of the comparator 315 described above and illustrated in FIG. 3A, according to some embodiments. As shown in FIG. 3B, the method 350 begins at step 352, where the monitor 112 receives a plurality of control efforts (e.g., the control efforts 314 of FIG. 3A). At step 354, the monitor 112 identifies, among the plurality of control efforts, a maximum control effort value (assuming the monitor 112 is configured to interpret the largest value as the highest demand for performance). At step 356, the monitor 112 receives a plurality of control effort limits (e.g., the control effort limits 334 of FIG. 3A). At step 358, the monitor 112 identifies, among the plurality of control effort limits and the maximum control effort (identified at step 354), a minimum value (assuming the monitor 112 is configured to interpret the smallest value as the lowest demand for performance). At step 360, the monitor 112 causes a performance level of a component to scale in accordance with the minimum value (identified at step 358).

Figure 4:
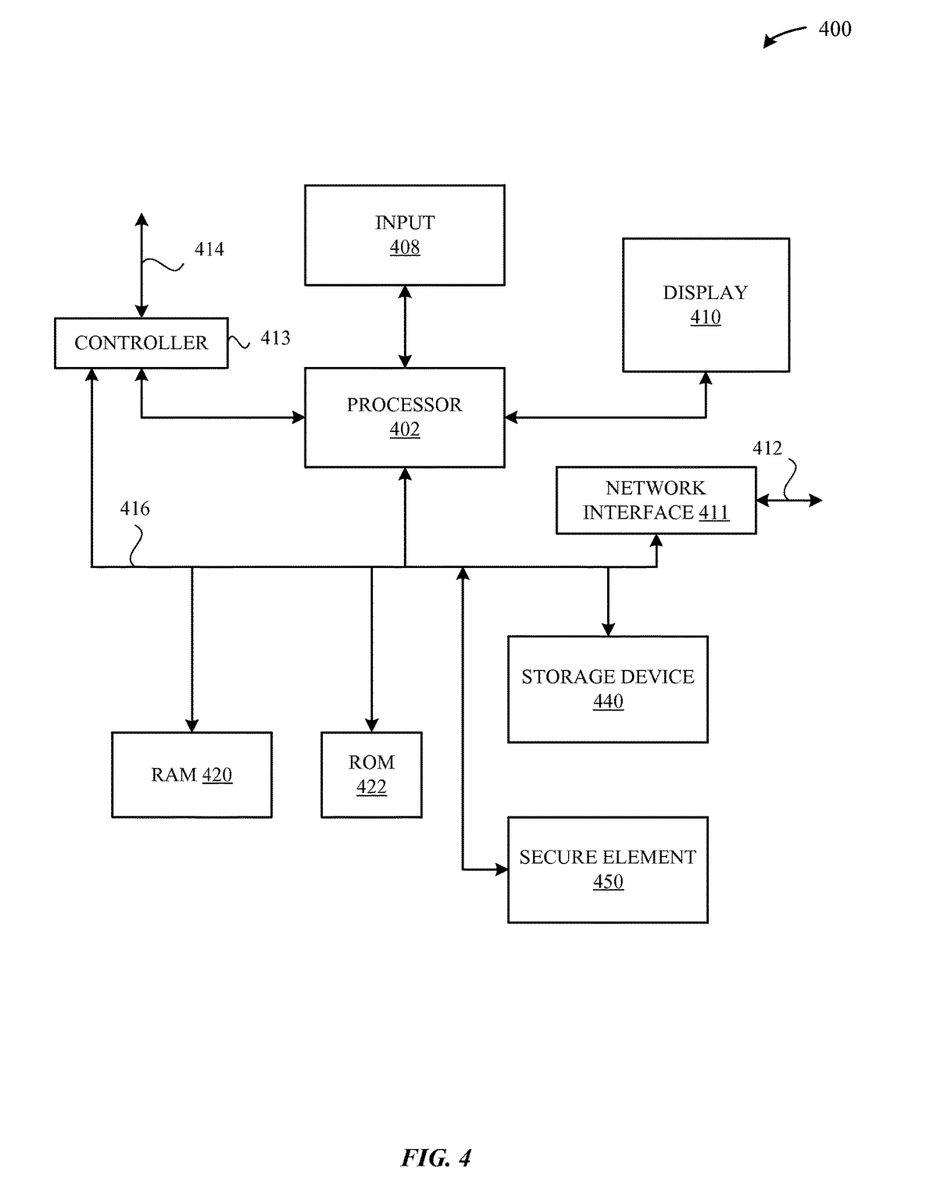
FIG. 4 illustrates a detailed view of a computing device that can be used to implement the various components described herein, according to some embodiments.

FIG. 4 illustrates a detailed view of a computing device 400 that can be used to implement the various components described herein, according to some embodiments. In particular, the detailed view illustrates various components that can be included in the mobile computing device 100 illustrated in FIG. 1. As shown in FIG. 4, the computing device 400 can include a processor 402 that represents a microprocessor or controller for controlling the overall operation of computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, etc. Still further, the computing device 400 can include a display 410 (screen display) that can be controlled by the processor 402 to display information to the user. A data bus 416 can facilitate data transfer between at least a storage device 440, the processor 402, and a controller 413. The controller 413 can be used to interface with and control different equipment through and equipment control bus 414. The computing device 400 can also include a network/bus interface 411 that couples to a data link 412. In the case of a wireless connection, the network/bus interface 411 can include a wireless transceiver.

The computing device 400 also include a storage device 440, which can comprise a single disk or a plurality of disks (e.g., hard drives), and includes a storage management module that manages one or more partitions within the storage device 440. In some embodiments, the storage device 440 can include flash memory, semiconductor (solid state) memory or the like. The computing device 400 can also include a Random Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of the computing device 400.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A method for scaling a performance mode of a component included in a mobile computing device, the method comprising:
   establishing one or more controllers, wherein each controller of the one or more controllers is configured to output a control effort having a value that corresponds to a throttling rate associated with a desired performance level for the component;
   establishing at least one controller limiter, wherein the at least one controller limiter is configured to output a control effort limit having a value that corresponds to a manner in which the throttling rate is engaging against the component, wherein the control effort limit is based in part on an error term comprising a difference between the throttling rate and a process variable;
   identifying, among the control efforts output by the one or more controllers, a particular control effort having a value above a target value; and
   utilizing the control effort limit to reduce the output value of the particular control effort, wherein utilizing the control effort limit to reduce the output value of the particular control effort comprises:
      producing a power management signal that is based on both the particular control effort and the control effort limit, wherein the power management signal is based on a minimum of the value of the particular control effort and the value of the control effort limit, and
      outputting the power management signal to a power manager included in the mobile computing device, wherein the power manager scales the performance level of the component in accordance with the power management signal.

2. The method of claim 1, wherein the control effort limit causes the performance level of the component to scale to a level that is less than the desired performance level associated with the control effort.

3. The method of claim 1, wherein the at least one controller limiter comprises a first additional controller limiter that is associated with power targets within the mobile computing device, and the at least one controller limiter comprises a second additional controller limiter that is associated with temperature targets within the mobile computing device.

4. The method of claim 1, wherein at least one of the one or more controllers is implemented as a closed loop performance control pipeline whose control effort is based on a rate at which frames are being input into a frame buffer.

5. The method of claim 1, wherein at least one of the one or more controllers is implemented as a closed loop performance control pipeline whose control effort is based on a utilization rate of a processor included in the mobile computing device.

6. The method of claim 1, wherein at least one of the one or more controllers is implemented as a closed loop performance control pipeline whose control effort is based on different types of instructions that are being issued to and processed by a processor included in the mobile computing device.

7. The method of claim 1, wherein at least one of the one or more controllers is implemented as a closed loop performance control pipeline whose control effort is based on a rate at which a central processing unit (CPU) included in the mobile computing device is issuing instructions to a graphics processing unit (GPU) included in the mobile computing device.

8. A non-transitory computer readable storage medium configured to store instructions that, when executed by a processor included in a mobile computing device, cause the mobile computing device to scale a performance mode of a component included in the mobile computing device, by carrying out steps that include:
   establishing one or more controllers, wherein each controller of the one or more controllers is configured to output a control effort having a value that corresponds to a throttling rate associated with a desired performance level for the component;
   identifying, among the control efforts output by the one or more controllers, a particular control effort having a value above a target value;
   establishing a controller limiter configured to output a control effort limit having a value that corresponds to a manner in which the throttling rate is engaging against the component, wherein the control effort limit is based in part on an error term comprising a difference between the throttling rate and a process variable; and
   utilizing the control effort limit to reduce the output value of the particular control effort, wherein utilizing the control effort limit to reduce the output value of the particular control effort comprises:
      producing a power management signal that is based on both the particular control effort and the control effort limit, wherein the power management signal is based on a minimum of the value of the particular control effort and the value of the control effort limit, and
      outputting the power management signal to a power manager included in the mobile computing device, wherein the power manager scales the performance level of the component in accordance with the power management signal.

9. The non-transitory computer readable storage medium of claim 8, wherein the control effort limit causes the performance level of the component to scale to a level that is less than the desired performance level associated with the control effort.

10. The non-transitory computer readable storage medium of claim 8, wherein the at least one controller limiter comprises a first additional controller limiter that is associated with power targets within the mobile computing device, and the at least one controller limiter comprises a second additional controller limiter that is associated with temperature targets within the mobile computing device.

11. The non-transitory computer readable storage medium of claim 8, wherein at least one of the one or more controllers is implemented as a closed loop performance control pipeline whose control effort is based on a utilization rate of a processor included in the mobile computing device.

12. A mobile computing device configured to scale a performance mode of a component included in the mobile computing device, the mobile computing device comprising:
the component; and
a processor configured to cause the mobile computing device to carry out steps that include:
establishing at least one controller, wherein the at least one controller is configured to produce a control effort having a value that corresponds to a throttling rate associated with a desired performance level for the component;
establishing at least one controller limiter, wherein the at least one controller limiter is configured to output a control effort limit that influences the control effort produced by the at least one controller, wherein the control effort limit is based in part on an error term comprising a difference between the throttling rate and a process variable; and
causing a performance level of the component to scale in accordance with the influenced control effort, wherein causing the performance level of the component to scale in accordance with the influenced control effort comprises steps that include:
producing a power management signal that is based on both the control effort and the control effort limit, wherein the power management signal is based on a minimum of the value of the control effort and the value of the control effort limit, and
outputting the power management signal to a power manager included in the mobile computing device, wherein the power manager scales the performance level of the component in accordance with the power management signal.

13. The mobile computing device of claim 12, wherein the influence the control effort limit has on the control effort causes the performance level of the component to scale to a level that is less than the desired performance level associated with the control effort.

14. The mobile computing device of claim 12, wherein the at least one controller limiter comprises a first additional controller limiter that is associated with power targets within the mobile computing device, and the at least one controller limiter comprises a second additional controller limiter that is associated with temperature targets within the mobile computing device.

15. The mobile computing device of claim 12, wherein the at least one controller is implemented as a closed loop performance control pipeline whose control effort is based on a utilization rate of the processor included in the mobile computing device.

* * * * *